S. KUCHARSKI.
CINEMATOGRAPHIC FILM.
APPLICATION FILED OCT. 1, 1919.
1,423,770.
Patented July 25, 1922.
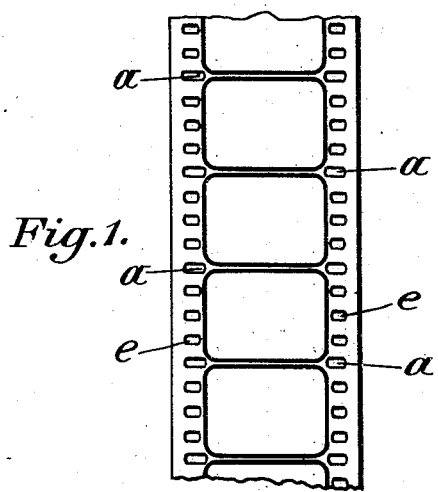
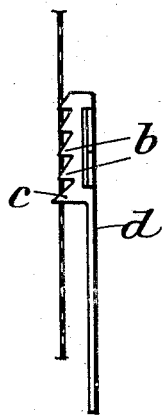
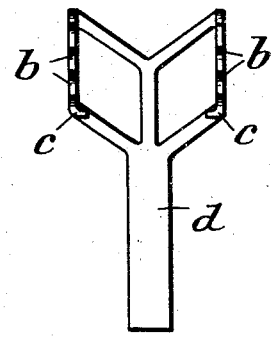
INVENTOR
Stanislaus Kucharski
BY ATTORNEYS
Pennie, Davis, Marvin & Edmonds.

UNITED STATES PATENT OFFICE.

STANISLAUS KUCHARSKI, OF CHARLOTTENBURG, NEAR BERLIN, GERMANY, ASSIGNOR TO RICHARD A. HANSEMANN, OF BERLIN, GERMANY.

CINEMATOGRAPHIC FILM.

1,423,770.  Specification of Letters Patent.  Patented July 25, 1922.

Application filed October 1, 1919. Serial No. 327,831.

*To all whom it may concern:*

Be it known that I, STANISLAUS KUCHARSKI, engineer, a citizen of Germany, residing at and whose post-office address is Charlottenburg, near Berlin, Dernburgstrasse 45, Germany, have invented certain new and useful Improvements in Cinematographic Films; and I do hereby declare the following to be a full, clear, and exact description of the invention, such as will enable others skilled in the art to which it appertains to make and use the same.

This invention relates to a perforated cinematographic film and consists in a special arrangement of the perforations by which the pictures are automatically centered. Ordinary films bearing series of pictures have two uniform series of holes near their edges, the number of holes per picture at each side being four. As these holes are perfectly uniform it often happens that a picture appears one or two holes too low or too high at the observation opening. It is then necessary to make the film register with the said opening or window by means of a manually operated centering device.

A known means of avoiding this centering method consists in providing series of holes differing in pitch. But in the first place toothed drums with different teeth at either side are difficult to make, and secondly, existing films are not suitable for the new arrangement of the perforations.

These disadvantages are avoided by this invention, the important point of which is providing, at periodic intervals equal to the distance the film is advanced for each picture, a pair of perforations which are elongated in a direction transversely of the film.

A manner of carrying out the invention is illustrated in the drawing in which—

Fig. 1 shows the film with the elongated holes $a$.

Fig. 2 illustrates a side view and

Fig. 3 a front view of the film shifting device.

The film shown in Fig. 1 is provided with the usual perforations $e$, here shown as three in number, alongside each picture. That pair of perforations $a$ on the line of separation between the pictures is, however, elongated in a direction transversely of the film, so that they are longer than the other perforations, but longitudinally of the film they are of the same dimension as the other perforations. In other words, at periodic intervals, corresponding to the length of film advanced for each picture, there is located a pair of perforations, which are elongated in a direction transverse of the film, so that they are longer than the other perforations. While such elongated perforations are preferably on the line of separation between adjacent pictures, it is obvious that they may be arranged in any given relationship to the picture, for example, on the line of the middle of the picture, as long as the interval between adjacent pairs of elongated perforations is equal to the interval between adjacent pictures.

By the use of the elongated perforations $a$ which are of the same dimension longitudinally as the other perforations, the arrangement is adaptable to standard size film and standard size pictures.

A film feeding device for feeding the film perforated according to the invention is shown in Figs. 2 and 3. The feeder $d$ there shown is a reciprocatable element provided with a plurality of short teeth $b$ adapted to engage in the smaller perforations $e$ of the film, and with one or more longer and wider teeth $c$ which, on account of their size, can only enter the larger perforations $a$. The teeth $c$ being wider than any of the perforations $e$ cannot enter any of such perforations.

The device operates as follows: If the film is properly positioned for correct projection on the screen, the wide teeth $c$ engage in the wide perforations $a$ on each stroke of the feeder and advance the film one picture. Suppose, however, the film is improperly positioned. This would mean that one of the perforations $a$ would be above the tooth $c$, Fig. 2, a distance less than the width of a picture. The feeder $d$ would be raised its normal stroke, but due to the improper positioning of the picture, there would be no pair of perforations $a$ in a position to receive the wide teeth $c$. On the down stroke, therefore, none of the teeth of the feeder $d$ would engage with the film, because they would be held away therefrom by the longer and wider teeth $c$ sliding down the film. However, as soon as the wide teeth $c$ come opposite a pair of perforations $a$, they would engage therein and advance the film. This advance would, of course, be a distance somewhat less than the normal advance for each picture; at the end of such advance, however, it is evident that the film is properly positioned and that on the next stroke it will be advanced the normal amount. The corrective positioning is evidently automatic in character.

I claim:

1. A film bearing a series of pictures provided with a number of holes near each edge for each picture one of which is larger than the others in a direction transverse to the length of the film but of the same dimensions in the longitudinal direction of the film.

2. A film bearing a series of pictures, provided with a number of holes near each edge for each picture one of which is larger than the others, in a direction transverse to the length of the film but of the same dimensions in the longitudinal direction of the film, each larger hole registering with a space between adjacent pictures.

3. The combination of a film bearing a series of pictures, provided with a number of holes near each edge for each picture one of which is larger than the others, in a direction transverse to the length of the film but of the same dimensions in the longitudinal direction of the film, and a film feeding member having a plurality of projections for cooperation with the holes, one of said projections being of a greater width transversely of the film than the other projections.

In testimony whereof I affix my signature, in presence of two witnesses.

STANISLAUS KUCHARSKI.

Witnesses:
PAUL MASCOW,
PAUL GALDA.